(12) United States Patent
Delobel et al.

(10) Patent No.: US 10,079,412 B2
(45) Date of Patent: Sep. 18, 2018

(54) ELECTROCHEMICAL ELECTRICITY STORAGE CELL

(71) Applicant: RENAULT s.a.s., Boulogne-Billancourt (FR)

(72) Inventors: Bruno Delobel, Issy les Moulineaux (FR); Philippe Recouvreur, Montrouge (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 597 days.

(21) Appl. No.: 14/437,260

(22) PCT Filed: Oct. 11, 2013

(86) PCT No.: PCT/FR2013/052434
§ 371 (c)(1),
(2) Date: Jul. 8, 2015

(87) PCT Pub. No.: WO2014/064360
PCT Pub. Date: May 1, 2014

(65) Prior Publication Data
US 2015/0325888 A1 Nov. 12, 2015

(30) Foreign Application Priority Data

Oct. 22, 2012 (FR) ...................... 12 60043

(51) Int. Cl.
*H01M 2/06* (2006.01)
*H01M 10/613* (2014.01)
(Continued)

(52) U.S. Cl.
CPC ........... *H01M 10/613* (2015.04); *H01M 2/06* (2013.01); *H01M 2/305* (2013.01);
(Continued)

(58) Field of Classification Search
None
See application file for complete search history.

(56) References Cited

U.S. PATENT DOCUMENTS 6,010,800 A * 1/2000 Stadnick ........... H01M 10/6553
429/120
6,767,666 B2 * 7/2004 Nemoto .............. H01M 10/052
429/120
(Continued)

FOREIGN PATENT DOCUMENTS

| JP | 2006 172870 | 6/2006 |
|---|---|---|
| WO | 2012 029944 | 3/2012 |
| WO | 2012 167022 | 12/2012 |

OTHER PUBLICATIONS

French Search Report dated Jul. 15, 2013 in French Patent Application No. 1260043 Filed Oct. 22, 2012.
(Continued)

*Primary Examiner* — Tracy Dove
(74) *Attorney, Agent, or Firm* — Oblon, McClelland, Maier & Neustadt, L.L.P.

(57) ABSTRACT

An electrochemical electricity storage cell including a casing including: at least two positive electrodes connected to a positive terminal, at least two negative electrodes connected to a negative terminal, the positive and negative electrodes being stacked in an alternating manner in the casing. At least one spacer is placed between each of the positive and negative electrodes. At least one contact element is placed in contact with the positive and negative electrodes and the casing.

10 Claims, 5 Drawing Sheets

(51) Int. Cl.
*H01M 10/04* (2006.01)
*H01M 2/30* (2006.01)
*H01M 10/625* (2014.01)
*H01M 10/654* (2014.01)
*H01M 10/6552* (2014.01)

(52) U.S. Cl.
CPC ..... *H01M 10/0413* (2013.01); *H01M 10/625* (2015.04); *H01M 10/654* (2015.04); *H01M 10/6552* (2015.04); *H01M 2220/20* (2013.01)

(56) References Cited

U.S. PATENT DOCUMENTS

| | | | |
|---|---|---|---|
| 9,666,907 B2 * | 5/2017 | Wang | H01M 10/6554 |
| 9,689,624 B2 * | 6/2017 | Timmons | B60L 3/0046 |
| 2012/0164492 A1 | 6/2012 | Lachenmeier et al. | |
| 2012/0308869 A1 | 12/2012 | Obasih et al. | |
| 2013/0295430 A1 | 11/2013 | Kurahashi | |
| 2014/0349145 A1 * | 11/2014 | Hyde | H01M 10/5077 429/50 |

OTHER PUBLICATIONS

International Search Report dated Feb. 5, 2014 in PCT/FR2013/052434 Filed Oct. 11, 2013.

\* cited by examiner

ELECTROCHEMICAL ELECTRICITY STORAGE CELL

1. FIELD OF THE INVENTION

The present invention relates to the field of electrochemical cells for storing electricity, in particular for motor vehicle batteries, although the invention is not limited to this field of application.

2. SOLUTIONS OF THE PRIOR ART

Conventionally, an electrochemical cell for storing electricity consists of one or more positive electrodes stacked alternately with one or more negative electrodes, as well as one or more separators so as to separate the positive and negative electrodes, and a leaktight casing which may be flexible, as in the case of a "pouch cell", or rigid for a "hard casing" cell.

With reference to FIG. 1, an electrochemical cell 100 is presented, comprising a casing 101 in which a plurality of positive electrodes 102, connected to a positive terminal 105, are arranged alternately with negative electrodes 103 connected to a negative terminal 106. Separators 104 impregnated with electrolyte are formed between each positive and negative electrode. These separators, as well as the positive and negative electrodes, have a substantially rectangular profile and are placed in a plane parallel to the (x,y) plane, which corresponds to the longitudinal plane of the cell.

In order to cool such an electrochemical cell, it is common to use covers or spacers made of aluminum, placing them in contact with the surface of the cell in order to conduct heat out of the cell. This technique is, for example, illustrated by document US2012/0009455, which describes a battery module using a plurality of cells separated by spacers having an "L-shaped" profile. The heat exchange therefore takes place on the surface of the cell, in contact with the spacer, that is to say the direction of the longer side of the spacer.

One drawback of this technique is that the use of spacers between each of the cells significantly increases the volume and the mass of the battery of the vehicle. Furthermore, it also leads to a relatively high implementation cost, which is not satisfactory.

Another drawback of this technique is that the transfer of heat from each of the cells to the neighboring spacer will be conditioned by the contact between the rigid casing and the cell, which is not optimal because the quality of this contact is difficult to control (it depends on conditions of manufacturing, handling, etc.). For this reason, imperfect contact and therefore a limited contact surface relatively significantly reduces the heat exchange, and therefore the cooling of the cell, which is not satisfactory.

Yet another drawback of this technique is that the cooling is not optimal. This is because the internal structure of the cell consists of a stack of negative electrodes and positive electrodes separated by separators impregnated with electrolyte. Thus, the thermal conductivity toward the surface of the cell will be limited by the thermal conductivity of the various materials, for example separators made of polyolefin (polyethylene, polypropylene) with a thermal conductivity of less than 1 watt per meter per kelvin, electrodes made of aluminum or copper with a conductivity of more than 100 watts per meter per kelvin, and by the thermal resistances at the interfaces between the various electrodes and/or separators.

Cooling techniques using means for circulating air at the surface of the cell are also known. However, a drawback of such a cooling technique is that it uses means having significant size as well as a relatively high cost, which is not satisfactory either. Furthermore, the maintenance cost of such a technique also proves relatively high.

3. OBJECTS OF THE INVENTION

The objects of the invention are, in particular, to overcome at least some of the drawbacks of the prior art.

More precisely, it is an object of at least one embodiment of the invention to provide an electrochemical cell for which the contact surface between the edges of the electrodes and the casing is improved in order to optimize the cooling of the electrochemical cell by removing heat over the entire contact zone between the casing and the electrodes.

It is another object of at least one embodiment to reduce the size of such electrochemical cells in order to facilitate use in all possible types of vehicles, or which can be used in most envisionable cases.

It is yet at least one other object of an embodiment of the invention to provide a solution which is simple to implement and economical.

4. SUMMARY OF THE INVENTION

These objects, as well as others which will become apparent below, are achieved with the aid of an electrochemical cell for storing electricity, comprising a casing in which the following are arranged:
- at least two positive electrodes connected to a positive terminal,
- at least two negative electrodes connected to a negative terminal, said at least two positive electrodes and at least two negative electrodes being stacked alternately in the casing, and at least one separator being placed between each of said at least two positive and negative electrodes.

According to the invention, the electrochemical cell furthermore comprises at least one contact element arranged in contact with the positive and negative electrodes and the casing. This contact element makes it possible to optimize the contact between the casing and the positive and negative electrodes, and thus to increase the heat exchange between the edges of each of the electrodes and of the separator with the casing. Consequently, the heat exchange with the outside of the cell is promoted, which improves the cooling in comparison with the techniques of the prior art.

Thus, the invention provides a novel and inventive approach making it possible to optimize the contact surface between the electrodes and the casing and thus to improve the cooling of the electrochemical cell by removing heat over the entire contact zone between the casing and the electrodes, and more particularly at the edges. Specifically, when the electrodes are stacked, the heat exchange is facilitated when it takes place through the edges of the cell rather than at the surface. When it takes place at the surface of the cell, the heat exchange is limited by the thermal conductivity of the electrodes and of the separators. The invention makes it possible to overcome these constraints by allowing optimal heat exchange via the edges of the electrodes and of the separators.

In one particular embodiment, the contact element comprises at least one heat pipe, of which a first end is connected to the contact element and a second end is formed outside the electrochemical cell.

The placement of such an element thus makes it possible to increase the cooling rate of the cell by limiting the number of physical barriers.

According to various embodiments of the invention, the casing of the cell is made either of a flexible material or of a rigid material.

Thus, this makes it possible to adapt the electrochemical cell for the majority of common uses of such cells. Specifically, a flexible material will allow a certain flexibility of the electrochemical cell and will also allow the casing to adopt substantially the shape of the electrodes. For its part, a rigid material will be able to form a protective casing for the cells.

Furthermore, according to the embodiments, the contact element may be made either of polymer or of elastomer.

In one embodiment of the invention, the positive electrodes and the negative electrodes are of substantially rectangular shape.

In this case, the contact element may be formed either over the width or over the length of the positive and negative electrodes, between the edges of these electrodes and the casing.

This makes it possible to adapt the size of such electrochemical cells according to the use.

The invention also relates to a battery comprising at least one electrochemical cell, and to a corresponding vehicle.

5. LIST OF THE FIGURES

Other characteristics and advantages of the invention will become clearer on reading the following description of an embodiment, given simply by way of illustration and without limitation, and the appended drawings, in which.

Figure 3:
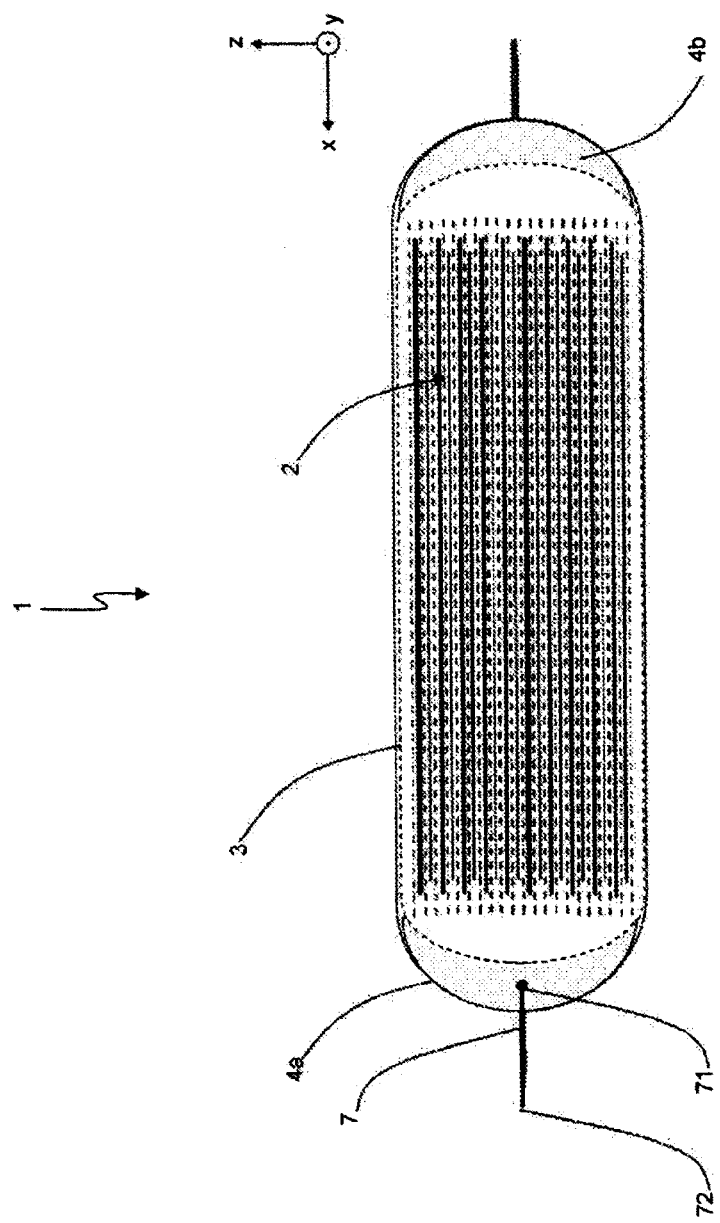
Figure 4:
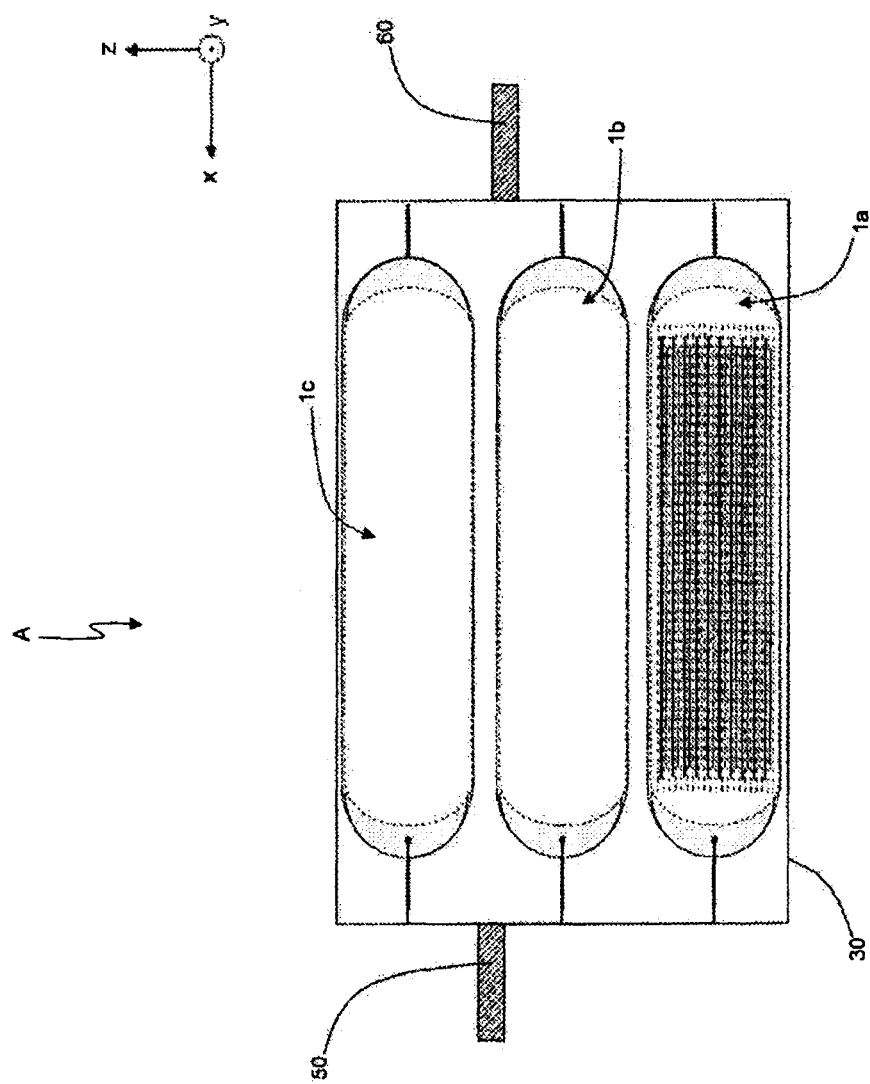
Figure 5:
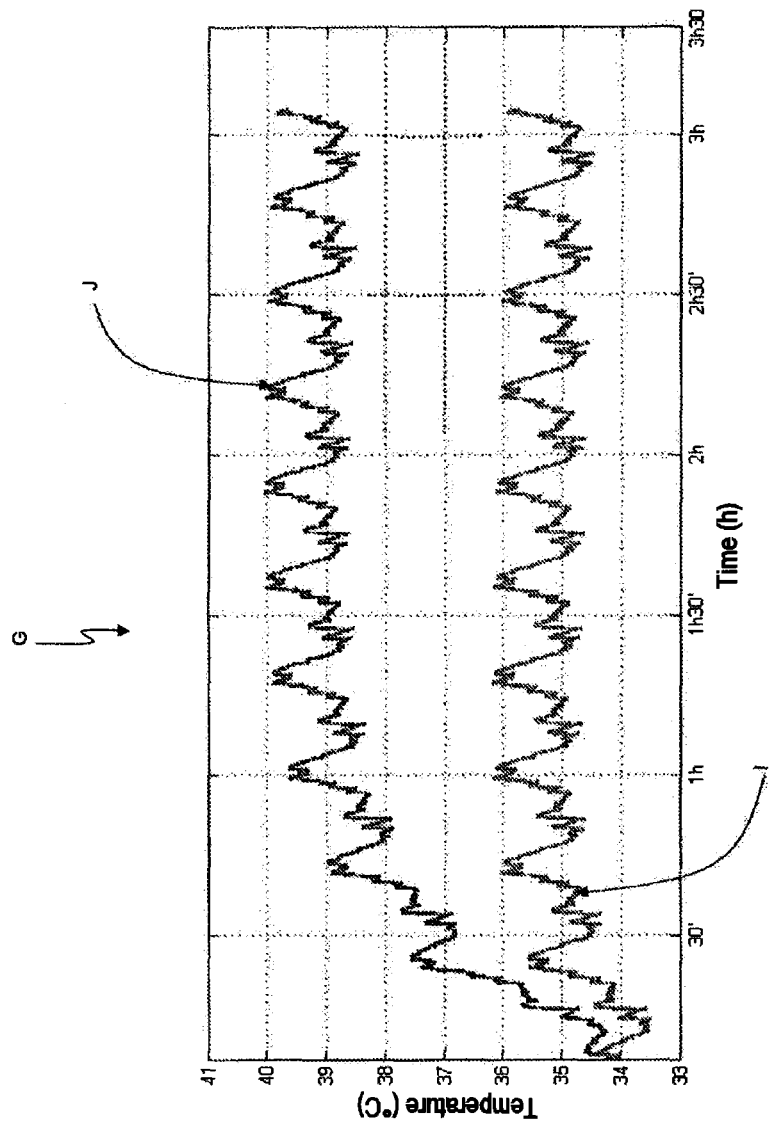

FIG. 3 is a view in section along the (x,z) plane of an electrochemical cell according to a second embodiment of the invention; and FIG. 4 is a view in section along the (x,z) plane of a motor vehicle battery using a plurality of electrochemical cells according to the second embodiment; and FIG. 5 is a graph presenting the variation in temperature as a function of time for a cell of the prior art and for a cell according to the invention.

6. DETAILED DESCRIPTION

In the rest of the description, the x axis is defined as being the longitudinal direction of a cell according to the invention. The y and z axes, which are orthogonal to the x axis, respectively define the width and the thickness of the cell. Furthermore, the (x,y) plane corresponds to the plane of the electrodes while the (x,z) plane corresponds to a transverse plane orthogonal to the (x,y) plane.

Figure 1:
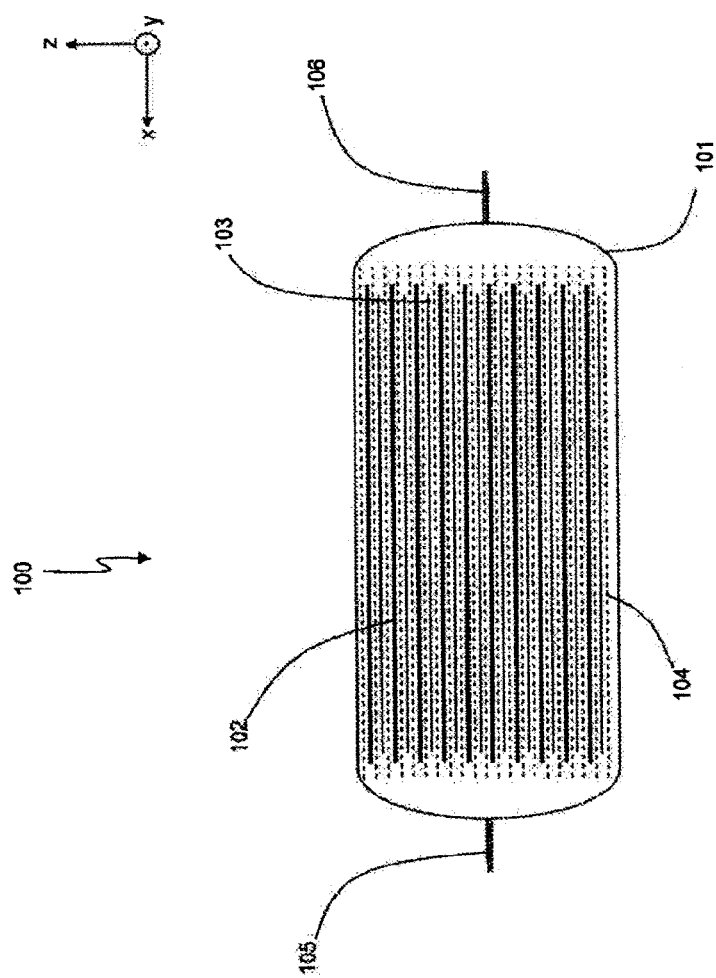
FIG. 1 is a view in section along the (x,z) plane of an electrochemical cell of the prior art.
Figure 2:
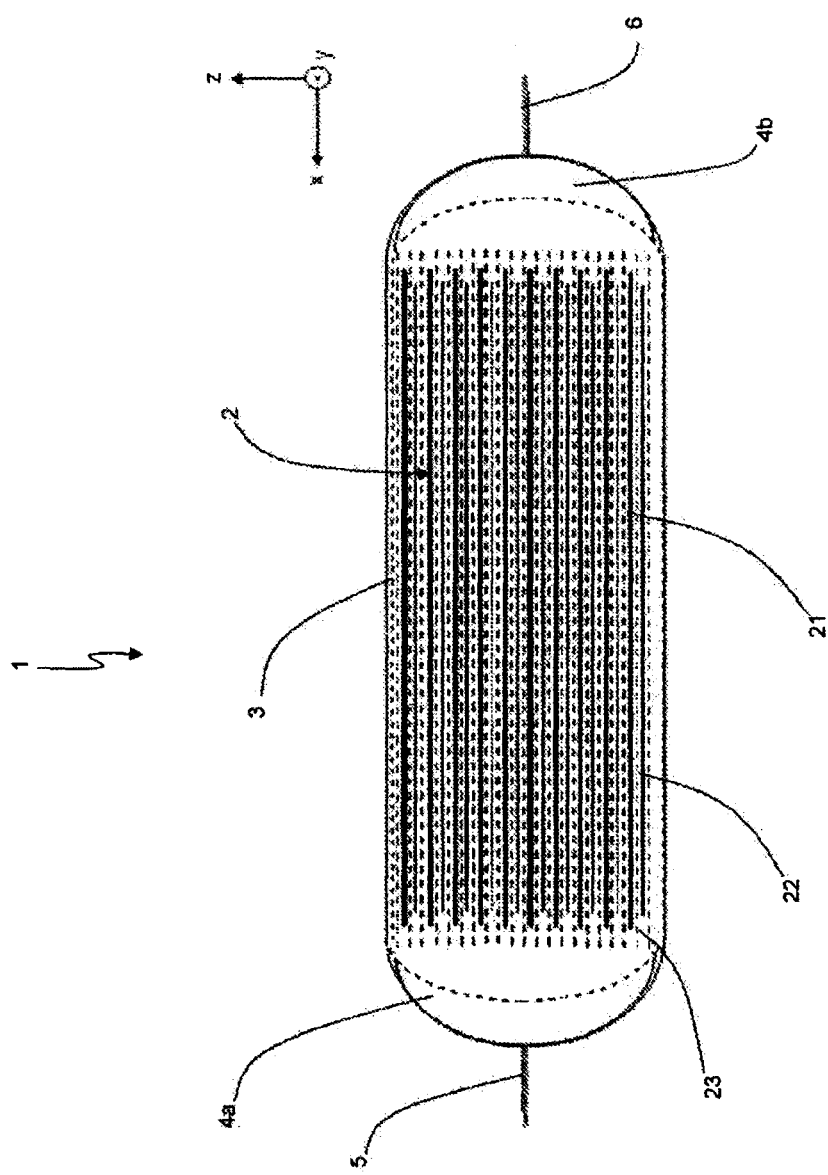
FIG. 2 is a view in section along the (x,z) plane of an electrochemical cell according to a first embodiment of the invention.

A first embodiment of the invention is now presented with reference to FIG. 2.

As illustrated in this FIG. 2, the electrochemical cell comprises a casing 3 which, in this example, is a flexible casing made of polymer. A plurality of positive electrodes 21 in alternation with negative electrodes 22 are arranged in this casing 3. Inserted between each of the positive and negative electrodes, there is a separator 23 impregnated with an electrolyte in a known way, thus making it possible to conduct the electric current between the positive 21 and negative 22 electrodes.

The assembly 2 formed by the positive electrodes, the negative electrodes and the separators has a substantially rectangular profile and is formed in a substantially horizontal plane parallel to the (x,y) plane.

The electrochemical cell 1 also comprises contact elements 4a, 4b arranged at the ends of the positive and negative electrodes along the x direction, that is to say over the width of the electrodes, between the assembly 2 and the casing 3. These contact elements, which in this example are in the form of a foam consisting of a polymer such as polyethylene terephthalate (PET), make it possible to optimize the contact between the electrodes and the casing and thus to increase the thermal conductivity at the interface. All the heat, or at the very least a large part of it, will therefore be dissipated at the ends of the (x,y) plane, which corresponds to the edges of the electrodes.

In another embodiment, contact elements which are adhesively bonded to the package in order to reduce the risk of these elements being detached during the lifetime of the cell may be envisioned. An embodiment in which the contact elements are premolded in the casing in order to improve the contact with each of the electrodes may also be envisioned. It is also possible to provide other embodiments in which the contact elements are made of elastomer, or another polymer such as polypropylene (PP) or polyethylene (PE).

In variants of the invention, contact elements used at the ends of the negative and positive electrodes, but in the y direction, i.e. over the length of the electrodes, may also be envisioned.

An embodiment in which a single contact element is used, for example at one of the ends of the electrodes, along the x or y direction, may furthermore be envisioned.

Moreover, an embodiment in which the cell has only one positive electrode and one negative electrode, which are separated by a separator, could be provided.

It is also possible to provide embodiments in which the casing is rigid and made of other materials, such as metal. An embodiment in which the electrodes and the separators are not planar but circular-cylindrical, and arranged concentrically, may also be envisioned.

In the embodiment in which the electrodes and the separators are concentric cylindrical-circular, it is conceivable for the contact elements to be placed at the ends of the electrodes along the x direction, corresponding to the longitudinal direction of the cell, between the electrodes and the casing.

An embodiment in which a single contact element is used at one of the ends of the electrodes, along the x direction, may also be envisioned.

A view in section of an electrochemical cell according to a second embodiment of the invention is now presented with reference to FIG. 3.

In this embodiment, the electrochemical cell 1 furthermore comprises a heat pipe 7, of which a first end 71 is connected to the contact element 4a and a second end 72 is formed outside the electrochemical cell 1. Installing this heat pipe 7 inside the cell makes it possible to limit the number of physical barriers by creating a "bridge" between the inside of the cell and the outside. This thus promotes the dynamics of the thermal dissipation inside the cell.

A view in section along a (x,z) plane of a motor vehicle battery, that is to say a cross section, using a plurality of electrochemical cells 1 according to the invention, each comprising a heat pipe, is now presented with reference to FIG. 4.

As illustrated in this FIG. 4, the battery A comprises three electrochemical cells 1a, 1b, 1c implemented according to the second embodiment presented above. These three electrochemical cells are stacked along the z direction, corresponding to the direction perpendicular to the plane of the electrodes, which, in this example, are rectangular. They are placed in a compartment 30 forming the housing of the battery A, this housing furthermore comprising a positive terminal 50 and a negative terminal 60.

In other variants, batteries comprising one or more cells adopting different configurations may of course be envisioned. For example, a battery comprising a plurality of rows of cells stacked along the y axis may be envisioned. Embodiments in which the cells are for example placed end-to-end along the x axis, which corresponds to the longitudinal axis of the cells, may also be provided. Embodiments in which some of the cells are provided with heat pipes, while others are not, may also be provided.

A graph showing the variation of the internal temperature (ordinate axis) as a function of time (abscissa axis) for a cell of the prior art and for a cell according to the invention is now presented with reference to FIG. 5.

This graph G comprises a curve J presenting the variation of the internal temperature of a cell of the prior art as a function of the operating time. In this example, it can be seen that the curve J rises rapidly during the first hour then rises more slowly during the next thirty minutes, before reaching a maximum of 40 degrees. During the rest of the operating time of this battery, the temperature oscillates between 38.5 degrees and 40 degrees Celsius.

A second curve I of the graph G presents the variation of the internal temperature of an electrochemical cell according to the invention as a function of the operating time. In contrast to curve J, curve I rises slowly during the first 45 minutes then stabilizes at a maximum value of 36 degrees. During the rest of the operation of the cell, the internal temperature will oscillate between 34.5 and 36 degrees Celsius.

A temperature difference of about 4 degrees Celsius is therefore observed between a cell of the prior art and a cell according to the invention, which, by virtue of the cooling means employed, therefore has a relatively lower internal temperature.

Clearly, these values and orders of magnitude are only examples developed here by way of simple examples illustrating the gains in terms of the cooling of an electrochemical cell according to the invention.

The invention claimed is:

1. An electrochemical cell for storing electricity, comprising:
   a casing including:
      at least two positive electrodes connected to a positive terminal, and
      at least two negative electrodes connected to a negative terminal,
      the at least two positive electrodes and the at least two negative electrodes being arranged alternately in the casing, at least one separator being placed between each of the at least two positive electrodes and the at least two negative electrodes that are alternately arranged; and
   at least one contact element arranged in contact with the at least two positive electrodes and the at least two negative electrodes and the casing,
   wherein each said at least one contact element is continuous and spans the at least two positive electrodes and the at least two negative electrodes, and
   wherein the at least one contact element includes two contact elements, a first contact element and a second contact element, the first and second contact elements being arranged at opposite ends of the at least two positive electrodes and the at least two negative electrodes.

2. The electrochemical cell as claimed in claim 1, wherein the at least one contact element in includes at least one heat pipe including a first end connected to the at least one contact element and a second end formed outside the electrochemical cell.

3. The electrochemical cell as claimed in claim 1, wherein the casing is flexible.

4. The electrochemical cell as claimed in claim 1, wherein the casing is rigid.

5. The electrochemical cell as claimed in claim 1, wherein the at leak one contact element is made of polymer.

6. The electrochemical cell as claimed in claim 1, wherein the at least one contact element is made of elastomer.

7. The electrochemical cell as claimed in claim 1, wherein the at least two positive electrodes and the at least two negative electrodes are of substantially rectangular shape.

8. The electrochemical cell as claimed in claim 1, wherein the at least one contact element is formed over the length of the at least two positive electrodes and the at least two negative electrodes.

9. A motor vehicle battery comprising at least one electrochemical cell for storing electricity as claimed in claim 1.

10. A motor vehicle comprising at least one motor vehicle battery as claimed in claim 9.

* * * * *